United States Patent [19]
Ross et al.

[11] 4,415,795
[45] Nov. 15, 1983

[54] TORCH SUPPORT AND HEIGHT SENSOR APPARATUS FOR SHAPE CUTTING MACHINES

[75] Inventors: John W. Ross; Pertti T. Raty, both of Toronto, Canada

[73] Assignee: Union Carbide Canada Limited, Toronto, Canada

[21] Appl. No.: 262,835

[22] Filed: May 12, 1981

[51] Int. Cl.³ .............................................. B23K 9/00
[52] U.S. Cl. .......................... 219/121 PH; 219/124.02; 219/121 PV; 266/76
[58] Field of Search ................... 219/121 PT, 121 PV, 219/124.02, 124.03, 69.6, 121 PH; 266/76

[56] References Cited
U.S. PATENT DOCUMENTS

| | | | |
|---|---|---|---|
| 3,595,545 | 7/1971 | Sitnichenko et al. | 219/124.02 |
| 4,284,871 | 8/1981 | Mawson et al. | 219/121 PV |
| 4,302,656 | 11/1981 | Poth et al. | 219/124.02 |
| 4,345,131 | 8/1982 | Semon et al. | 219/124.02 |

*Primary Examiner*—M. H. Paschall
*Attorney, Agent, or Firm*—William G. Hopley; Albert E. Koller; James C. Arvantes

[57] ABSTRACT

This invention provides an improved method for employing a plasma-arc cutting torch to cut a metal plate. The improvement consists in operating the torch with its lower portion submerged in a layer of water provided over the workpiece. In order to allow automatic adjustment of the torch to the appropriate working height above the workpiece, a mechanism is provided for mounting the torch with respect to the support carriage which guides its horizontal path. This mounting mechanism is such as to allow relative up and down movement between the torch and the support carriage and includes a detecting mechanism including a frame and vertical slides on which the cutting torch is secured so that when the mounting mechanism is lowered to the point where the torch touches the metal plate, the detecting mechanism communicates a signal for the upward movement of the mounting mechanism thereby raising the torch to a predetermined cutting distance from the metal plate.

11 Claims, 10 Drawing Figures

TORCH SUPPORT AND HEIGHT SENSOR APPARATUS FOR SHAPE CUTTING MACHINES

This invention relates generally to the automatic cutting of predetermined shapes in metal plate employing a shape cutting machine, and has to do particularly with a method and apparatus for allowing the initial stand-off height of a plasma cutting torch head from the metal plate to be established. This invention also relates to an improvement in the conventional plasma arc cutting process.

BACKGROUND OF THIS INVENTION

The plasma arc cutting process, during the two decades or so since its development, has become a firmly established production tool in the metal fabrication industry. Its wide acceptance is the result of unique advantages such as the ability to cut any metal at relatively high cutting speeds. These advantages are made possible by features that are characteristic to this process only: namely the extremely high temperatures and high gas velocities which are needed to turn the more common electric arc into a plasma arc. Essentially, a plasma arc differs from the common electric arc in the following way. Whereas the electric arc cutting (or welding) process requires the electrical current to jump across an intervening air space between the cutting or welding head and the metal workpiece, the plasma arc process provides a high-velocity stream or jet of gas which is directed toward the workpiece, and which literally carries the current with it by virtue of being highly ionized. In effect, the gas is forced to pass first in front of an electrode contained in the cutting torch head, from where it passes in a high-velocity jet directly to and against the metal workpiece.

Despite the versatility of the plasma arc cutting process, and the high cutting speeds which it makes possible, the same characteristics which lead to these advantages also are associated with important drawbacks. For one, the high temperature utilized is responsible for the generation of toxic fumes such as ozone and oxides of nitrogen, and also produces fine metal particulate matter in the cutting fumes. The supersonic gas velocity, needed to blow out the molten metal in order to obtain high cutting speeds, is responsible for the high noise levels generated by the process. Finally, intense ultraviolet radiation is emitted by the arc. These characteristics, even though they have always been inseparable parts of the plasma arc cutting process, are receiving more scrutiny in this era of increased health and safety consciousness. The health hazards arising from these characteristics are presently the only real obstacle to an even wider acceptance of the plasma arc cutting process.

The conventional way of coping with the problems just mentioned was to employ a so-called water table under the metal plate being cut, and to make use of water mufflers. The principle here is that the smoke passing through and under the plate being cut was scrubbed by the water in a boxed-in table, while the noise level and the ultraviolet radiation were reduced by a water "curtain" generated around the lower end of the torch by a water muffler. These methods work well enough if there is no gap between the bottom of the plate and the underlying water table, but since the plates are seldom straight, gaps do not occur and these allow fumes to escape from under the plate. Any such gaps also tend to act as echo chambers, and accentuate the noise generated by the process.

GENERAL DESCRIPTION OF THIS INVENTION

It is an aspect of this invention to provide an improvement of the conventional plasma arc cutting process, by which noise, ultraviolet radiation and the generation of toxic materials can be significantly reduced, without interfering with the cutting process itself.

Broadly, the solution is to carry out the cutting process under water which overlies the metal plate being cut. It has been found that the plasma arc cutting process is just as efficient under water as above water. By submerging the plate under about 50 mm of water, all three of the problem areas mentioned earlier are taken care of. It has been found that the noise level is reduced below about 85 dBA at 2 m, that the fumes are almost totally eliminated, and that the arc can be viewed without shaded shields. It has been found that the speed of cutting and the quality of the cut are unaffected by the total immersion.

The concept of submerging the workpiece under about 50 mm of water, however, raises certain problems in connection with the conventional control means utilized for operating the plasma torch in terms of its vertical position.

A conventional shape-cutting machine utilizing a plasma arc torch normally will shift the torch into general position above the plate prior to cutting. In such position, the torch would be several inches or more above the height that it will eventually employ for the cutting procedure. Once the torch has reached a position over the designated starting point on the plate, the shape cutting machine lowers the torch to the appropriate height for initiating the cutting procedure. Currently, several means are employed for signalling to the shape cutting machine that the torch has reached the appropriate cutting height. One of these involves capacitance. A capacitive plate is associated with the plasma arc torch head, and an electrical charge is applied between the capacitive plate and the workpiece. As these approach each other during descent of the plasma arc torch head, capacitance increases due to the fact that the two plates of the capacitor are approaching each other. The change in capacitance is detected electronically, and when the capacitance reaches a certain level which is precalibrated to correspond with a desired height for the torch above the workpiece, the downward movement of the torch is arrested, and the cutting procedure is initiated.

Another procedure for bringing the torch to the correct working height above the workpiece is to use cutting fluid (water and/or gas) associated with the process. The cutting fluid thus blows against the top of the workpiece. The back pressure in the jet can be sensed, and as the torch nozzle approaches the surface of the workpiece, this back pressure will change. A sensing device then signals the shape cutting machine to stop the downward motion of the torch, so that the cutting can begin. A further procedure is the so-called pilot-arc sensing method, in which the proximity of the workpiece is sensed using the voltage and/or current between the torch and the workpiece.

It will be appreciated that the proposal herein, namely to cover the workpiece with up to 50 mm of water, effectively prevents all the above conventional control mechanisms for operating. It is therefore an aspect of this invention to provide a substitute mechanism by which the initial height of the torch above the workpiece can be established, even though the workpiece is covered by water. It will be appreciated from what follows that this particular mechanism can be used also in the absence of any water.

Accordingly, this invention provides, in a cutting apparatus having a torch-support member, a plate-sensing member supported from said torch-support member, a first means for moving the torch-support member toward and away from an underlying metal plate, second means for moving the torch-support member horizontally so that a torch supported from said torch-support member can make a desired cut in the metal plate, the improvement which comprises:

mounting means mounting the plate-sensing member to the torch-support member in a manner which allows relative movement between the plate-sensing member and the support member parallel to the direction in which the first means moves the torch-support member, said direction having a vertical component, said mounting means including:

(a) stop means for establishing a lowermost position of the plate-sensing member with respect to the torch-support means, (b) detecting means for generating a signal upon detecting a predetermined degree of upward movement of the plate-sensing member from said lowermost position, (c) and means for communicating said signal to said first means to instruct the latter to move the torch-support upwardly.

This invention provides a method of cutting a substantially horizontal metal plate, which includes the steps:

providing a layer of water over the plate, and employing a plasma-arc cutting torch controlled by a shape-cutting machine to cut the said plate, the plasma-arc cutting torch having a lower, working end defining an orifice through which high-velocity ionized gas issues, the position of the cutting torch during operation being such that the said orifice is located below the general surface level of the water, whereby fumes, noise levels and escaping ultraviolet radiation are all reduced to accessable levels.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THE DRAWINGS

Figures 1, 2:
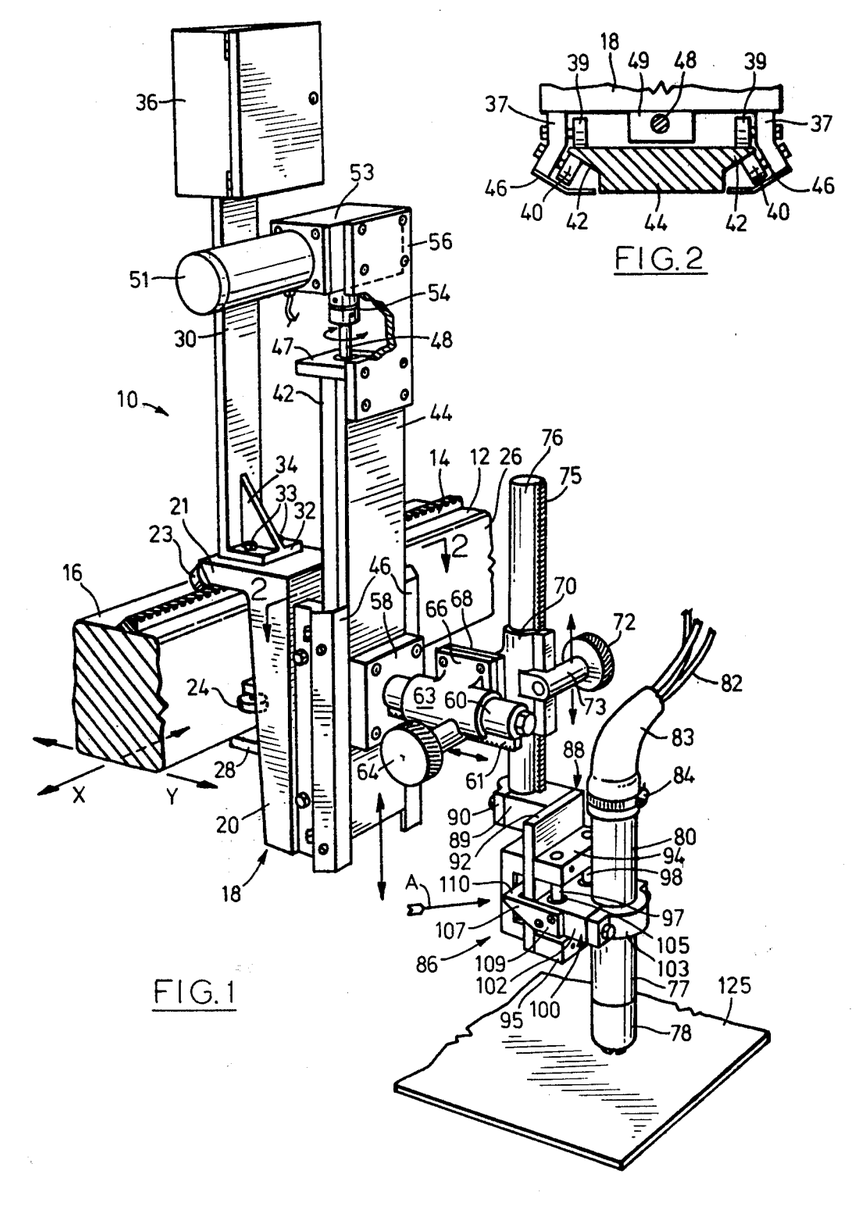
FIG. 1 is a perspective view of the first embodiment, showing the height adjustment mechanism provided by this invention
FIG. 2 is a horizontal sectional view taken at the line 2—2 in FIG. 1.

Turning first to FIG. 1, the numeral 10 designates a portion of a conventional shape cutting machine, which includes a beam member 12 which is adapted to be moved by conventional means in a horizontal plane, with X-Y motion. The latter term designates motion in the horizontal plane, with the X and Y axes being perpendicular to each other. Arrows at the left in FIG. 1, associated with the beam 12, show the X-Y arrangement. Since the means by which the beam 12 is moved in horizontal directions is conventional, the same does not have to be shown or described in this specification. As seen in FIG. 1, the beam 12 is substantially rectangular in section, and supports a rack 14 on its upper surface 16.

Supported from the beam 12 and slidable therealong is a carriage 18 which includes a substantially vertical portion 20, and a substantially horizontal portion 21. The carriage 18 thus has an inverted L-shape. At the leftward or remote end of the portion 21 of the L-shaped carriage 18 are two rollers 23 (only one roller visible in FIG. 1), which bear against and roll along the further edge of the rack 14, which is obliquely sloped and defines an obtuse angle with that part of the upper surface 16 which is on the other side of the rack 14 from the position of the viewer. Two bearing rollers 24 (only one visible in FIG. 1) are supported from the vertical portion 20 of the L-shaped carriage 18, and bear against the vertical flank 26 of the beam 12. A bracket 28 is secured to the vertical portion 20 and extends therefrom horizontally at a location just under the bottom of the beam 12, thereby functioning as a carriage retainer, preventing the carriage 18 from being lifted vertically upwardly from the position in which it is shown in FIG. 1. In order to remove the carriage 18 from the FIG. 1 position, it would be first rotated in the counter-clockwise direction about the rollers 23, to bring the bracket 28 clear of the beam 12, and then the entire carriage 18 can be lifted upwardly away from the beam.

Located above and extending upwardly from the horizontal portion 21 of the carriage 18 is an L-shaped member 30 having a foot portion 32 secured to the portion 21 by suitable fastening members 33, and a triangular brace 34. At the top of the L-shaped member 30 there is supported a control box 36 containing the electronic control circuitry and related apparatus.

Referring to FIGS. 1 and 2 together, two obtuse-angled bar members 37 are welded vertically to the portion 20 of the carriage 18, at horizontally spaced-apart locations. Each bar member 37 supports two vertically spaced inner rollers 39 (see FIG. 2), and two outer rollers 40 in horizontal alignment with the corresponding inner rollers 39. The outer rollers 40 are angulated with respect to the inner rollers 39, and are set to receive the acute-angled wings 42 of an elongated plate 44. As can be seen in FIG. 2, the acute-angled wings 42 are received snugly between adjacent pairs of inner and outer rollers 39 and 40, and due to the angulation of the rollers a secure and stable grip on the plate 44 is provided, while permitting the plate 44 to move vertically with respect to the carriage 18. Two cover plates 46 are provided to protect the rollers 39 and 40, and for reasons of personnel safety.

At the top of plate 44 is an end plate 47 which projects inwardly (leftwardly) from the plate 44, and through which is journalled a shaft 48. The journalling of the shaft 48 in the end plate 47 is such as to permit the shaft 48 to rotate with respect therewith, but not to move in a longitudinal direction with respect thereto.

At a location on the portion 20 of the carriage 18 which is approximately mid-way of its height, there is provided a block 49, affixed to the carriage 18, and having a threaded vertical bore. The shaft 48 is threaded over most of its length except the uppermost end, and is adapted to threadedly engage the threaded bore in the block 49. Since the block is affixed with respect to the carriage 18, and since the shaft 48 is journalled in the end plate 47 in such a way that the shaft and the plate 44 retain the same longitudinal relationship, it will be understood that rotation of the shaft 48 with respect to the block 49 will cause the plate 44 to move upwardly or downwardly, depending upon the direction of rotation of the shaft 48.

Rotation of the shaft 48 is accomplished by an electrical motor 51 which operates through a reduction gearing mechanism 53 to rotate a coupling 54 to which the upper end of the shaft 48 is connected. The motor 51 is reversible, and therefore the same can be used both to raise and to lower the plate 44.

The housing of the reduction gearing mechanism 53 is supported with respect to the plate 44 by a support plate 56.

A mounting plate 58 bolted to the plate 44 supports a horizontal member 60 having a rack 61 along its lower edge. The member 60 extends horizontally at right angles from the plate 44, and it is cylindrical except for the location of the rack 61. A slide bracket 63 is adapted to slide along the member 60, and its movement is manually controllable by virtue of a knurled knob 64 secured to a shaft (not visible) which is in turn secured to a pinion (not visible) whose teeth engage the rack 61. The slide bracket 63 is integral with a fastening base 66 which is in turn secured to the fastening base 68 of a slide bracket 70 which is rotated through 90° with respect to the slide bracket 63. The slide bracket 70 also includes a knurled, manually rotatable knob 72 which is connected with a shaft (not visible) within a cylindrical housing 73, the shaft being connected to a pinion of which the teeth engage the teeth of a further rack 75 which is affixed longitudinally to a slide member 76. The slide member 76 is oriented vertically, and is adapted to reciprocate vertically within the slide bracket 70, whenever the knob 72 is rotated.

Shown in FIG. 1 is a plasma-arc cutting torch 77, which includes a metallic lower protective cap 78, and an elongated cylindrical body 80 which is typically of plastic or other non-metallic material. The internal operation and construction of the torch 77 is not pertinent to this invention, and will not be described here. Extending out the top of the body portion 80 are various gas supply tubes, cooling water tubes and the electrical connections, shown collectively by the numeral 82 in FIG. 1. The attachment between these supply lines and the tube 80 is protected by a flexible sleeve 83 which may be of rubber or other suitable material. The sleeve 83 is secured to the body portion by a ring clamp 84.

A mounting means 86 is adapted to mount the cutting torch 77 with respect to the member 76 in a manner which allows relative up and down movement between the torch 77 and the member 76. The first embodiment of the mounting means 86 (that seen in FIGS. 1, 3, 4 and 5) includes a frame 88 which is fixed with respect to the member 76 by virtue of a bracket 89, the bracket 89 cooperating with a clamp 90 to grip the lower end of the member 76. The frame 88 includes a vertical plate 92 which supports two vertically spaced brackets 94 and 95, both extending to the same side of the plate 92 (rightwardly in FIG. 1). The brackets 94 and 95 support the ends of two horizontally spaced vertical posts 97 and 98. Slidably supported for vertical motion along the posts 97 and 98 is a carriage 100 which includes a block member 102 and a clamp 103 cooperating with the block member 102 to grip and support the torch 77. As can be seen in FIG. 1, the clamp 103 defines a part cylindrical portion which, together with a part cylindrical recess in the block 102 defines a cylindrical gap into which the torch 77 can be locked.

The block 102 has, mounted within it, two anti-friction, axial bearings 105 of conventional construction, adapted to receive and slide upon the posts 97 and 98.

Figure 3:
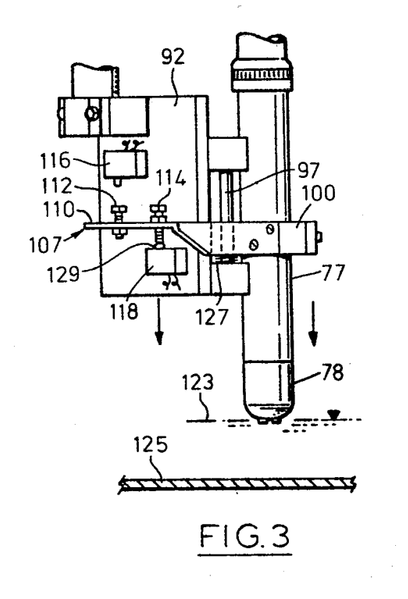
FIGS. 3, 4 and 5 are elevational views looking along the arrow A in FIG. 1, showing sequential stages in the adjustment operation for torch height, the portion shown being the first embodiment of the mechanism of this invention.
Figure 4:
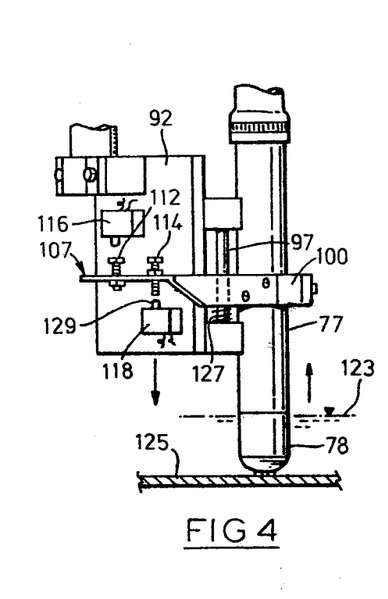
Figure 5:
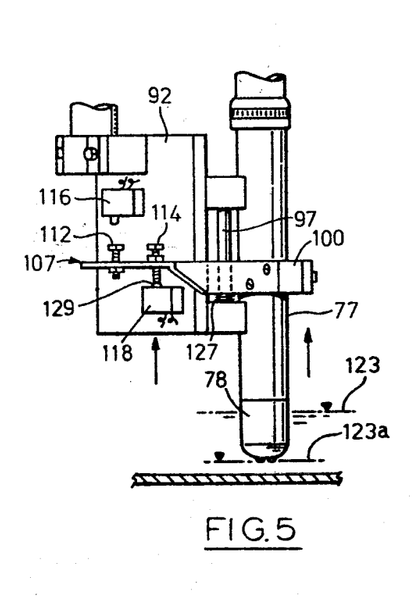

Secured to the block 102 is a switch-operating arm 107, which is substantially L-shaped and includes a mounting end 109 and a contact end 110. As best seen in FIGS. 3, 4 and 5, the contact end 110 of the switch-operating arm 107 is, in effect, cantilevered behind the plate 92, and supports two adjustable fastening members 112 and 114, which are adapted to operate microswitches 116 and 118, respectively, Microswitch 116 is a safety switch, which in normal operation would not be activated. Microswitch 118 acts as a primary detector, and its signal is used to control the direction of rotation of the reversible motor 51, in a manner which will be explained below.

Figures 9, 10:
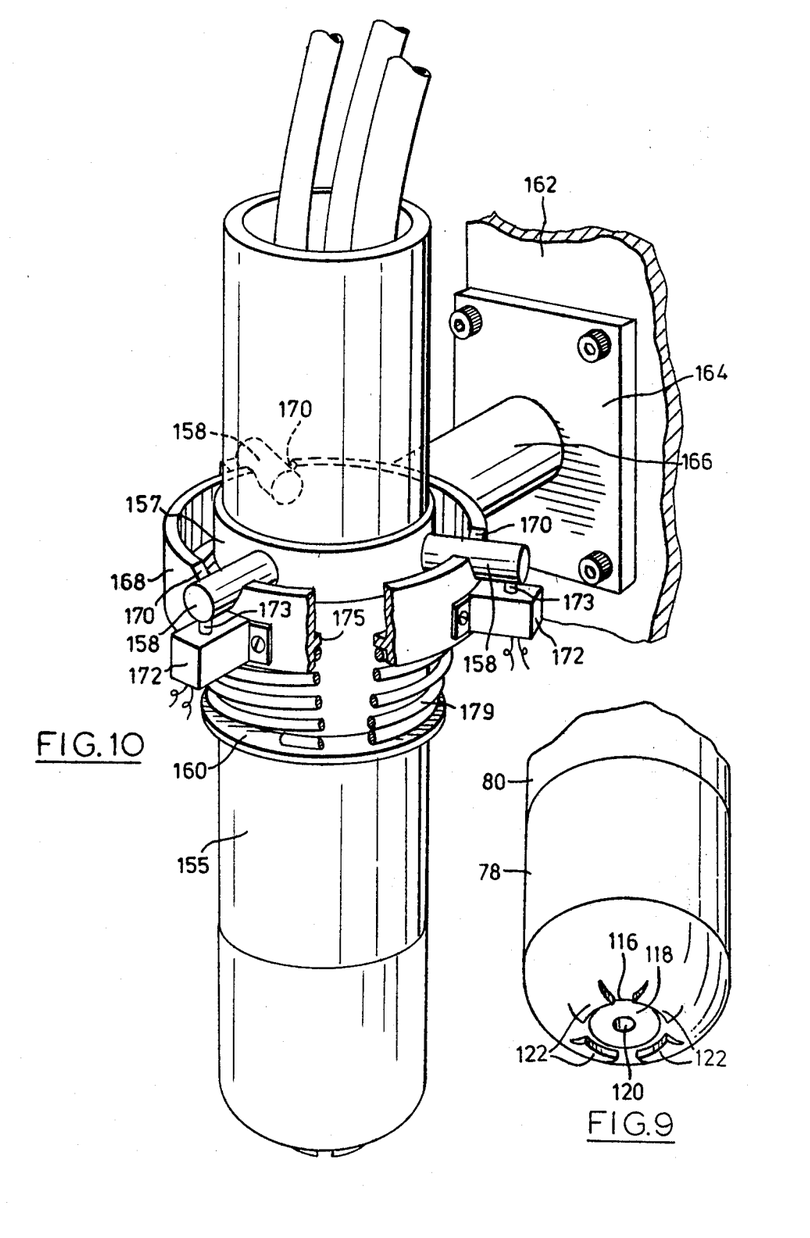
FIG. 9 is a perspective view of the lower end of the plasma arc cutting torch.
FIG. 10 is a partly broken-away perspective view of the third embodiment of this invention.

Before describing the operation of the apparatus referred to above, attention is directed to FIG. 9, which shows the bottom end of a typical torch (turned upwardly in this figure), which has been modified for use with the method and apparatus disclosed herein. The cap 78 on the end of the body portion 80 defines an opening 116 which is sized to surround an insulative annular member 118 which is part of and supported from the internal structure of the torch. The cap 78 is normally internally threaded, and can be threaded on and off the body portion 80. When the cap 78 is removed, the annular member 118 remains in position. The annular member 118 defines a central orifice 120 through which the high-velocity ionised gas can issue during operating of the torch. In conventional cap constructions, the annular member 118 is the lowermost portion of the entire structure, and is not protected in any way from contact with the plate being cut. In conventional constructions, it is not necessary to protect the annular member 118, because the safety arrangements are such that the torch never comes into contact with the plate being cut. However, for safety reasons it would be of advantage to include this modified cap construction even in conventional systems.

However, for the operation of the method herein disclosed, it is necessary for the torch to come into contact with the plate being cut, prior to the beginning of the cutting operation, and for this reason the modified cap 78 seen in FIG. 9 has four protuberances 122 which are spaced evenly around the annular member 118, and protrude to a level below the annular member 118 (it being understood that "below" in FIG. 9 is seen as being above, since the torch is inverted). Thus, the annular member 118 is surrounded by metallic protuberances which eliminate the risk of contact between the fragile annular member 118 and the metal plate which is to be cut.

Referring to the procedure of this invention, it is emphasized that the method in its broad aspect is that of providing a layer of water over the plate which is intended to be cut by the plasma-arc cutting torch, and then employing such a torch, controlled by a shape-cutting machine, to cut the plate. During the cutting, the lower, working end of the torch 77 is positioned such that the orifice 120 is located below the general surface level of the water, whereby fumes, noise levels and escaping ultraviolet radiation are all reduced.

In FIGS. 3–5, a typical water level is shown at 123.

As previously described, a preferred but non-limiting range of water depth above the plate is about 50 mm, although it will be understood that variations in the torch size and other factors may make it appropriate to utilize other water depths. Generally speaking, a depth between about 25 mm and about 75 mm would normally be selected.

As explained earlier in this specification, it is necessary for the shape-cutting machine, which is an automatic machine, to first establish the torch 77 at the proper predetermined working level above the plate which is to be cut. As also explained earlier, the presence of the water over the plate (identified by the numeral 125) makes it impossible to use conventional techniques to "tell" the logic of the machine when the torch has reached the appropriate predetermined spacing above the workpiece 125.

With reference to FIGS. 3, 4 and 5, the way in which the apparatus described earlier accomplishes this step will now be described.

In FIG. 3, the torch 77 is located at a substantial distance above the plate, greater than the normal predetermined working distance. It is to be understood that the shape-cutting machine would typically raise the torch to such a "safe" distance, then position the torch over the plate in alignment with a desired starting position, then lower the torch to the predetermined working level, and then begin the cutting operation. In FIG. 3, the torch 77 is being lowered toward the plate 125. As can be seen, the carriage 100 is at the lowermost end of its possible travel with respect to the posts 97 and 98, and is resting upon washer members 127 enclosing the posts 97, 98 at the lower end thereof. In such position, the fastening member 114 which is adjustably secured to the contact end 110 of the switch operating arm 107 is depressing the contact 129 of the microswitch 118. The switch 118 is thus in a particular condition, and we will assume here that it is in the "closed" condition. The logic of the shape-cutting machine is adapted to receive a signal from the switch 118 corresponding to the "opening" thereof, and this takes place shortly after contact between the bottom end of the torch 77 and the workpiece 125. Attention is now directed to FIG. 4, which shows the situation a short time after this contact has taken place. Upon initial contact, the switch 118 is still closed. However, a very small further downward movement of the plate 92, while the torch 77 and the carriage 100 remain stationary, will suffice to move the switch 118 downwardly away from the fastening member 114, thus allowing the switch 118 to open. This signal is picked up by the logic of the shape-cutting machine, which immediately signals the motor 51 to reverse its direction of rotation for a predetermined length of time, after which the motor 51 is shut off. The said predetermined length of time is exactly that necessary to raise the plate 92 along with the torch 77 to the condition shown in FIG. 5, in which the lowermost end of the torch 77 is at the predetermined spacing above the workpiece 125, marked by line 123a.

The cutting operation can then begin, but this does not need to be described as it is entirely conventional.

Figure 6:
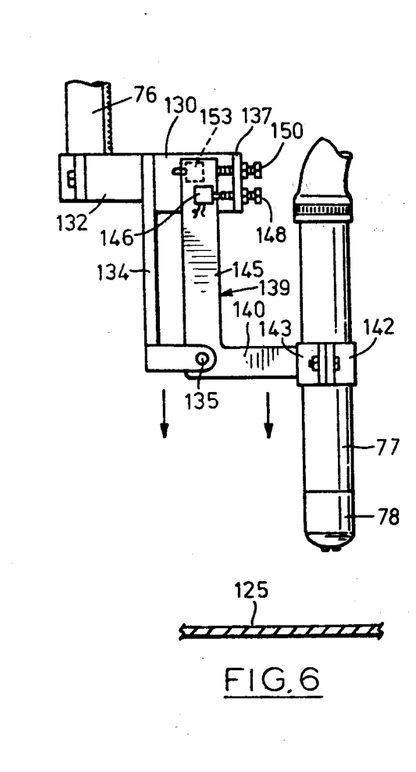
FIGS. 6, 7 and 8 are sequential views of the operation of the second embodiment of the mechanism of this invention, also intended to establish the torch at the proper working height above the workpiece.
Figure 7:
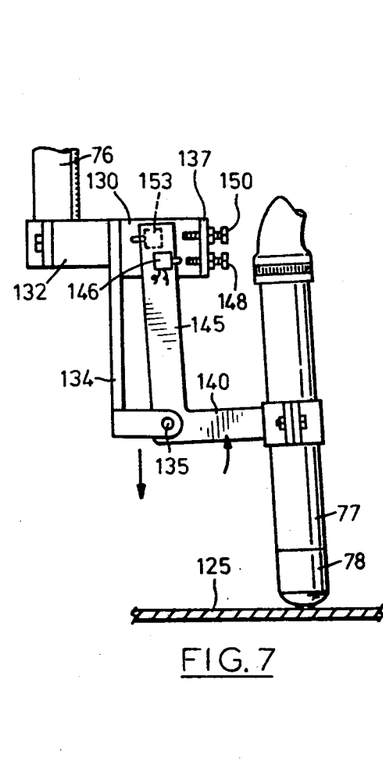
Figure 8:
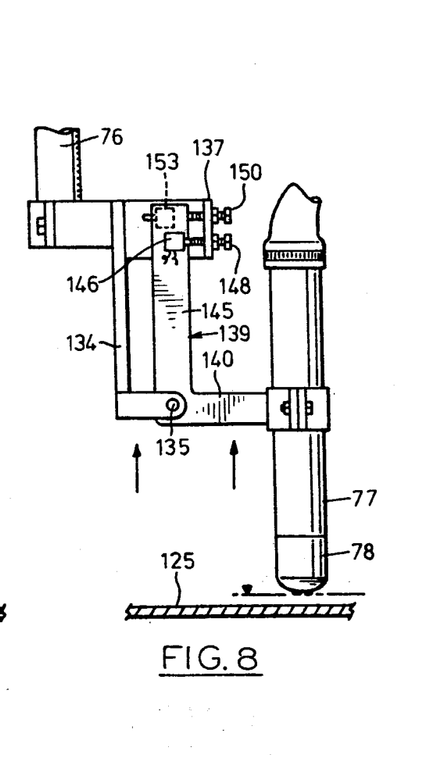

Attention is now directed to FIGS. 6, 7 and 8, which illustrate an alternative embodiment of the mounting portion which is inserted between the torch 77 and the vertically elongated member 76. In the case of FIGS. 6–8, the apparatus is somewhat simplified. It can be seen to include a frame 130 which includes a mounting portion 132 gripping the lower end of the member 76 in the same manner as is done in FIGS. 3–5, a downwardly extending L-shaped bracket 134 which supports a pivot location 135 that is fixed with respect to the frame 130, and a flange 137 which extends toward the viewer in FIGS. 6–8. The member 134 also is located toward the viewer with respect to the frame 130. Thus, the member 134, the flange 137 and the portion of the frame 130 between the latter two define a C-shaped configuration, with the ends of the "C" extending toward the viewer in these figures. A torch-holding member 139 is provided, the same being L-shaped and being pivoted to the member 134 at the pivot point 135. The pivot point 135 is located adjacent the elbow of the member 139. The torch-holding member 139 includes a horizontal arm 140 on the rightward or distal end of which the torch 77 is affixed by virtue of clamping members 142 and 143, and further has a vertical arm 145 which extends upwardly into the "C" shape defined between the flange 137, the member 134 and the portion of the frame 130 located between these two. A first microswitch 146 is affixed to the arm 145 and is adapted to be contacted by a first fastening member 148 which is secured to the flange 137. A stop adjustment fastening member 150 also passes through the flange 137 and is secured thereto, the arm 145 being aligned in such a way that it contacts the stop member 150 upon clockwise motion. When such contact takes place, the member 148 depresses the contact of the microswitch 146, thus placing the switch into a first condition. When the arm 145 swings in the counter-clockwise direction away from the flange 137, the microswitch 146 will go to its other condition because it will separate from the fastener 148.

It will be appreciated that, since the torch 77 is located such that its central axis is spaced horizontally from the pivot point 135, any upward force on the torch 77, as would occur when the torch during its descent contacted the workpiece 125, would cause the L-shaped torch-holding member 139 to swing in the counter-clockwise direction as seen in FIGS. 6–8, thus allowing the torch 77 to move upwardly with respect to the member 76, and also simultaneously moving the microswitch 146 leftwardly away from its contact with the member 148. This will place the microswitch 146 into its other condition, which the logic of the shape-cutting machine reads as a signal to reverse the motor 51, thus raising the member 76 and the torch 77 upwardly for a predetermined length of time, again selected so as to bring the bottom end of the torch 77 to a predetermined spacing above the workpiece 125. Contact between the torch 77 and the workpiece 125 is shown in FIG. 7, and FIG. 8 shows the torch 77 after it has been raised to the predetermined spacing above the workpiece 125.

A safety switch 153 is provided, also mounted on the upstanding or vertical arm 145 of the L-shaped torch-holding member 139. The safety switch 153 is adapted to contact the member 134, if for some reason the changing of the condition of the main microswitch 146 should fail to cause the motor 51 to reverse.

A particular advantage of the apparatus defined above becomes apparent when the plasma-arc torch is required to cut through a pre-existing kerf (a slot or cut) in the workpiece, and must approach the kerf at a small acute angle. Previously, difficulties were encountered in this connection due to the fact that the logic of the shape-cutting machine is conventionally arranged in such a way as to keep the torch 77 at a height which will bring about a pre-selected voltage-drop between the torch and the workpiece 125. This procedure is utilized in order to keep the torch at optimum height, regardless of whether the plate may be bent or in some form other than perfectly flat or horizontal. However, when the torch approaches and begins to cross a kerf at a small acute angle, the logic of the machine begins to "see" a rising voltage-drop, and in order to lower this voltage-drop it calls for the torch itself to be lowered. Thus, the machine is erroneously sensing a drop or decline in the plate. In conventional machines, this can lead to damaging of the torch when it comes into forceful contact with the workpiece. Such damage is unavoidable in conventional machines, because there is no play or slack between the torch and the guiding member to which it is attached, and no possibility for the torch to move vertically with respect to that member. The present invention overcomes this difficulty by providing a mechanism which allows up and down movement of the torch with respect to the primary guiding member, and further by providing the protective protuberances 122 (FIG. 9) around the annular member 118 (the most likely portion to sustain damage).

Also, as soon as the bottom of the torth comes into contact with the workpiece, the main microswitch will change its condition, and this will signal the logic of the machine to reverse the motor and raise the torch upwardly to the original memorized stand-off.

Attention is now directed to FIG. 10, in which a plasma-arc torch 155 is clamped inside a ring 157, the ring having three cylindrical outward projecting portions 158, located at 120° angles from each other.

Also secured to the torch 155 is an annular ring 160, the purpose of which will be discussed subsequently.

In FIG. 10, a plate portion 162 may be taken to correspond with the vertical plate 92 shown in FIG. 1, since both are adapted to be moved horizontally to follow the particular contour along which the plasma-arc cutting torch is intended to cut, and are also adapted to be moved in the vertical direction in order to bring the plasma-arc cutting torch down to an appropriate spacing with respect to the plate being cut. Thus, the plate portion 162 in FIG. 10 may be considered to be attached to the bottom of the member 76 in FIG. 1. Secured to the plate portion 162 is a rectangular plate 164 from which extends an arm 166, on the other end of which is located a collar 168 of larger diameter than the ring 157. The collar 168 has three V-shaped notches 170 at 120° intervals, in which the projecting portions 158 are intended to lodge. Mounted exteriorly of the collar 168, under each of the V-shaped notches 170, is a microswitch 172. Each microswitch 172 has a triggering member 173 which is depressed by the corresponding projecting portion 158, when the latter lies at the lower-most position in its respective V-shaped notch 170.

The collar 168 has an inward edge 175, which defines with the annular ring 160 a space within which a compression coil spring 179 is located. The spring 179 tends to push its two ends apart, and this tends resiliently to press the torch 155 downwardly so that the projecting portions 158 lodge within the respective V-shaped notches 170.

During the operation of the cutting procedure, the initial lowering of the cutting torch 155 toward the plate to be cut will result in contact between the two, and this will lift all of the projecting portions 158 upwardly from their respective microswitch contacts. The microswitches 172 would be wired in such a way that a change of state for any one of them would send a signal to the logic of the machine instructing it to immediately lift the cutting torch upwardly to a predetermined level for cutting.

Conveniently, the appropriate hook-up would be one in which the microswitches were wired in series, and were normally closed when the corresponding projecting portion pressed down against the trigger member 173. In this way, the lifting up of any one of the projecting portions 158 would open the series circuit, and this would send a signal to the logic as aforesaid.

The arrangement shown in FIG. 10 is also appropriate to allow the machine to lift up the torch upon sideward pressure at the bottom of the torch, for example due to the torch coming into contact with a side wall of the basin or tank within which the water is contained. Lateral or sideward pressure at the bottom of the torch 155 will cause a rotational moment in the region of the collar 168, and one or two of the projecting portions 158 will lift upwardly as a result. This will open one or two of the microswitches 172, and again the result will be that the machine will be instructed to lift the torch up to a predetermined level. It will be understood that this predetermined "safety" level could be different from the normal or "cutting" level at which the lower end of the torch would be under water in a cutting position.

It is understood for purposes of this invention that a probe may be extended from the mounting means 86 or from the torch itself for contacting the plate, in which case, such probe would represent the plate sensing member.

We claim:

1. In a cutting apparatus having a torch-support member, a plate sensing member supported from said torch-support member, a first means for moving the torch-support member towards and away from an underlying metal plate, a second means for moving the torch-support member horizontally so that a torch supported from said torch-support member can make a desired cut in the metal plate, the improvement which comprises in combination:
   (a) mounting means mounting the plate-sensing member to the torch-support member in a manner which allows relative movement between the plate-sensing member and the support member,
   (b) means for establishing a first position of the plate-sensing member with respect to the torch-support member and wherein said plate sensing member comprises the cutting torch itself,
   (c) detecting means for generating a signal upon detecting a predetermined degree of relative movement of the plate-sensing member from said first position said detecting means comprising an electrical switch which is triggered by relative movement between the frame and the carriage,
   (d) and means for communicating said signal to said first means for reversing the direction of movement of said torch support member.

2. An apparatus as claimed in claim 1 wherein the mounting means includes a frame, a carriage, and vertical slide means by which the carriage can move vertically with respect to the frame, the frame being fixed with respect to said support member, the cutting torch being mounted with respect to the carriage.

3. An apparatus as claimed in claim 2 wherein the frame includes a vertical plate supporting two vertically spaced brackets both extending to one side of the plate, the brackets supporting the ends of two horizontally spaced, vertical posts, the carriage having anti-friction axial bearings surrounding said posts and slidable thereon, the carriage having a portion supporting a vertically adjustable switch activator, said plate supporting beneath said activator an electrical switch constituting said detecting means, the switch being capable of activation by said switch activator.

4. An apparatus as claimed in claim 1 wherein there is further provided a safety switch adapted to be activated if the upward movement of the cutting torch from said lowermost position exceeds said predetermined degree by a given amount.

5. An apparatus as claimed in claim 1 wherein the mounting means includes a frame and means mounted for pivoting motion in a vertical plane, and detecting means for detecting said pivoting motion.

6. An apparatus as claimed in claim 5 wherein said torch-support member is adapted to support an elongated cutting torch in substantially vertical orientation with the center of the torch spaced horizontally from said pivot point, whereby upward force on the torch causes the torch to move upwardly as the torch-holding member pivots about said pivot point, the frame being fixed with respect to said support member.

7. An apparatus as claimed in claim 6 wherein said detecting means is an electrical switch which is triggered by relative movement between said frame and a portion of said torch-holding member.

8. An apparatus as claimed in claim 6 wherein the torch-holding member is L-shaped and in which said pivot point is adjacent the elbow of the L-shape, the member having a horizontal arm to which the torch is affixed, and a vertical arm to which said detecting means is affixed.

9. An apparatus as claimed in claim 8 wherein there is further provided a safety switch adapted to be activated if the upward movement of the cutting torch from said lowermost position exceeds said predetermined degree by a given amount.

10. An apparatus as claimed in claim 6 wherein the cutting torch is an elongated plasma-arc cutting torch having a lower working end which includes an insulative annular member defining an orifice through which high-velocity ionized gas can issue, and further having a plurality of downward protuberances spaced around said annular member and protruding to a level below the annular member, whereby the annular member is prevented from contacting the metal plate when the torch touches said plate.

11. A method of cutting a substantially horizontal metal plate which method comprises the steps of:
  (a) positioning said metal plate below the surface of a layer of water;
  (b) positioning a plasma-arc cutting torch secured to the mounting means of a shape cutting machine above said water level, said torch having a lower working end defining an orifice through which high-velocity ionized gas issues;
  (c) lowering the working end of said torch below the surface level of the layer of water;
  (d) discontinuing the downward movement of said torch at a lowermost position with respect to said plate as determined by a detecting means mounted on said shape cutting machine;
  (e) raising said torch to a predetermined cutting position with respect to said plate in response to a signal from a sensing means on the shape cutting machine position to cooperate with said detecting means.

* * * * *